(12) United States Patent
Takatsuka et al.

(10) Patent No.: US 10,661,857 B2
(45) Date of Patent: May 26, 2020

(54) DRIVE MODE SELECTION DEVICE AND DRIVE MODE SELECTION METHOD

(71) Applicant: OMRON Corporation, Kyoto-shi, Kyoto (JP)

(72) Inventors: Hiromasa Takatsuka, Tokyo (JP); Junichi Wada, Tokyo (JP); Kazuki Kasai, Tokyo (JP)

(73) Assignee: OMRON Corporation, Kyoto-shi (JP)

( * ) Notice: Subject to any disclaimer, the term of this patent is extended or adjusted under 35 U.S.C. 154(b) by 0 days.

(21) Appl. No.: 15/756,107

(22) PCT Filed: Aug. 24, 2017

(86) PCT No.: PCT/JP2017/030243
§ 371 (c)(1),
(2) Date: Feb. 28, 2018

(87) PCT Pub. No.: WO2018/051753
PCT Pub. Date: Mar. 22, 2018

(65) Prior Publication Data
US 2019/0185105 A1    Jun. 20, 2019

(30) Foreign Application Priority Data

Sep. 13, 2016    (JP) ................... 2016-178800

(51) Int. Cl.
*B62M 6/45* (2010.01)
*B62J 99/00* (2020.01)
(Continued)

(52) U.S. Cl.
CPC ............... *B62M 6/45* (2013.01); *B25J 11/00* (2013.01); *B60L 15/2045* (2013.01);
(Continued)

(58) Field of Classification Search
CPC ....................................................... B62M 6/45
See application file for complete search history.

(56) References Cited

U.S. PATENT DOCUMENTS 8,606,513 B2 * 12/2013 Chen .................. B60L 58/12
701/423
8,612,082 B2 * 12/2013 Hashimoto ........ G01C 21/3469
701/22

(Continued)

FOREIGN PATENT DOCUMENTS

CN    102233940 A    11/2011
CN    105314039 A    2/2016
(Continued)

OTHER PUBLICATIONS

An English translation of the International Search Report of PCT/JP2017/030243 dated Oct. 3, 2017.
(Continued)

*Primary Examiner* — Joseph T Phan
(74) *Attorney, Agent, or Firm* — Metrolex IP Law Group, PLLC (57) ABSTRACT

A drive mode selection device for selecting a drive mode of an assistance device that assists a user by generating motive power using electric power from a battery, and that can be driven in a plurality of drive modes having different outputs, the drive mode selection device comprises a task information acquisition unit configured to acquire task information, which is information relating to a predetermined task to be executed by the assistance device; a remaining charge acquisition unit configured to acquire a remaining charge of the battery; a power estimation unit configured to estimate a power amount discrepancy on the basis of the task information and the remaining charge of the battery; and a mode selection unit configured to select the drive mode on the basis of the estimation result.

13 Claims, 7 Drawing Sheets

ASSIST MODE TABLE

| MODE | AVERAGE POWER CONSUMPTION (PACKAGE: 10 kg) | AVERAGE POWER CONSUMPTION (PACKAGE: 20 kg) | ... |
|---|---|---|---|
| POWERFUL | AT LEAST 20.0[Wh/PACKAGE] | AT LEAST 40.0[Wh/PACKAGE] | ... |
| STANDARD | AT LEAST 15.0[Wh/PACKAGE] | AT LEAST 30.0[Wh/PACKAGE] | ... |
| ECO | AT LEAST 10.0[Wh/PACKAGE] | AT LEAST 20.0[Wh/PACKAGE] | ... |

(51) Int. Cl.
  *B25J 11/00* (2006.01)
  *B60L 15/20* (2006.01)
  *B60L 58/12* (2019.01)
  *B60L 50/20* (2019.01)
  *B62M 6/90* (2010.01)
  *G01C 21/34* (2006.01)

(52) U.S. Cl.
  CPC ............ *B60L 50/20* (2019.02); *B60L 58/12* (2019.02); *B62J 99/00* (2013.01); *B62M 6/90* (2013.01); *B60L 2200/12* (2013.01); *B60L 2240/42* (2013.01); *B60L 2240/54* (2013.01); *B60L 2260/52* (2013.01); *B60L 2260/54* (2013.01); *G01C 21/3469* (2013.01); *Y02T 10/7258* (2013.01); *Y02T 10/7275* (2013.01)

(56) References Cited

U.S. PATENT DOCUMENTS

| | | | | |
|---|---|---|---|---|
| 8,655,586 | B2* | 2/2014 | Jotanotivc | G01C 21/3469 701/457 |
| 8,874,367 | B2* | 10/2014 | Vicharelli | G01C 21/3469 701/423 |
| 9,576,490 | B1* | 2/2017 | Wang | G08G 1/096811 |
| 9,702,716 | B2* | 7/2017 | Siegel | G01C 21/3446 |
| 10,059,287 | B2* | 8/2018 | Dufford | G01C 21/3407 |
| 2010/0049333 | A1 | 2/2010 | Endo et al. | |
| 2011/0267178 | A1 | 11/2011 | Nishihara et al. | |
| 2012/0109515 | A1 | 5/2012 | Uyeki et al. | |
| 2014/0046595 | A1* | 2/2014 | Segawa | G01C 21/34 701/541 |
| 2014/0212243 | A1 | 7/2014 | Yagi et al. | |
| 2016/0031506 | A1 | 2/2016 | Lloyd et al. | |
| 2016/0031507 | A1 | 2/2016 | Neugebauer et al. | |
| 2016/0031513 | A1 | 2/2016 | Neugebauer et al. | |
| 2016/0031514 | A1 | 2/2016 | Gerhardt et al. | |
| 2016/0031516 | A1 | 2/2016 | Southey et al. | |
| 2016/0031517 | A1 | 2/2016 | Neugebauer et al. | |
| 2016/0031524 | A1 | 2/2016 | Gerhardt et al. | |
| 2016/0031525 | A1 | 2/2016 | Craven et al. | |
| 2016/0200394 | A1 | 7/2016 | Toya | |
| 2017/0259879 | A1 | 9/2017 | Southey et al. | |

FOREIGN PATENT DOCUMENTS

| | | | |
|---|---|---|---|
| GB | 2530619 | A | 3/2016 |
| JP | 2001-112121 | A | 4/2001 |
| JP | 2005-271613 | A | 10/2005 |
| JP | 2010-075658 | A | 4/2010 |
| JP | 2011-230714 | A | 11/2011 |
| JP | 2011-232241 | A | 11/2011 |
| JP | 2012-121338 | A | 6/2012 |
| JP | 2012-194136 | A | 10/2012 |
| JP | 2013-52192 | A | 3/2013 |
| JP | 2014-069690 | A | 4/2014 |
| JP | 2014-098617 | A | 5/2014 |
| JP | 2015-219070 | A | 12/2015 |
| WO | 2015/125430 | A1 | 8/2015 |

OTHER PUBLICATIONS

An English translation of the Written Opinion of PCT/JP2017/030243 dated Oct. 3, 2017.
The extended European search report (EESR) dated Oct. 22, 2018 in a counterpart European Patent application.
The Office Action dated May 31, 2019 in a counterpart Chinese patent application.
Office Action dated Mar. 17, 2020 in a counterpart Japanese patent application.

* cited by examiner

FIG. 1

TRAVEL LOG TABLE

| ELAPSED TIME FROM START OF TRAVEL | REMAINING BATTERY CHARGE | DISTANCE TRAVELED PER TIME STEP |
|---|---|---|
| 10'00" | 230Wh | 0m |
| 20'00" | 215Wh | 600m |
| 30'00" | 205Wh | 400m |
| 40'00" | 200Wh | 200m |
| ... | ... | ... |

FIG. 2

ASSIST MODE TABLE

| MODE | AVERAGE POWER CONSUMPTION |
|---|---|
| POWERFUL | AT LEAST 0.06[Wh/m] |
| STANDARD | AT LEAST 0.03[Wh/m] |
| ECO | AT LEAST 0.015[Wh/m] |

ASSIST MODE TABLE

| MODE | AVERAGE POWER CONSUMPTION (PACKAGE: 10 kg) | AVERAGE POWER CONSUMPTION (PACKAGE: 20 kg) | ⋮ |
|---|---|---|---|
| POWERFUL | AT LEAST 20.0[Wh/PACKAGE] | AT LEAST 40.0[Wh/PACKAGE] | ⋮ |
| STANDARD | AT LEAST 15.0[Wh/PACKAGE] | AT LEAST 30.0[Wh/PACKAGE] | ⋮ |
| ECO | AT LEAST 10.0[Wh/PACKAGE] | AT LEAST 20.0[Wh/PACKAGE] | ⋮ |

DRIVE MODE SELECTION DEVICE AND DRIVE MODE SELECTION METHOD

TECHNICAL FIELD

The present invention relates to a technique for controlling a device that assists a person using motive power.

BACKGROUND ART

Bicycles (power-assisted bicycles) having a motor for providing additional driving force are widely known. A power-assisted bicycle is heavy due to the motor and a battery provided therein, and therefore, when the battery runs down, an amount of torque required to drive the power-assisted bicycle increases greatly. Hence, a user of the power-assisted bicycle must manage a state of charge of the battery appropriately to ensure that the battery does not run down on the go.

A power-assisted bicycle typically has a plurality of travel modes in which different degrees of assistance are provided. For example, a mode in which powerful assistance can be provided over a short travel distance, a mode in which the assist force is weaker but the travel distance is extended, and so on are often provided. The user of the power-assisted bicycle can adjust a travelable distance by switching the mode during travel so as to adjust the assist force.

CITATION LIST

Patent Literature

[PTL 1] Japanese Patent Application Publication No. 2012-121338
[PTL 2] Japanese Patent Application Publication No. 2015-219070

SUMMARY OF INVENTION

Technical Problem

With the power-assisted bicycle according to the prior art, however, the assist strength can be modified by the rider by switching the travel mode manually, but control for determining an appropriate assist strength in consideration of the remaining battery charge, the travelable distance, and so on is not performed.

In other words, there is room for improvement in terms of selecting a favorable assist strength at which assistance does not become impossible during travel.

The present invention has been designed in consideration of the problem described above, and an object thereof is to provide a drive mode selection device for appropriately selecting an assist strength of an assistance device that assists a user using electric power.

Solution to Problem

The present invention in its one aspect provides a drive mode selection device for selecting a drive mode of an assistance device that assists a user by generating motive power using electric power from a battery, and that can be driven in a plurality of drive modes having different outputs, the drive mode selection device comprising a task information acquisition unit configured to acquire task information, which is information relating to a predetermined task to be executed by the assistance device; a remaining charge acquisition unit configured to acquire a remaining charge of the battery; a power estimation unit configured to estimate a power amount discrepancy on the basis of the task information and the remaining charge of the battery; and a mode selection unit configured to select the drive mode on the basis of the estimation result.

The assistance device is a device for assisting an operation performed by a user using motive power that is generated using electric power from a battery. The assistance device may be a device mounted on a bicycle to assist pedal power, a device attached to the body to assist muscle power, or the like, for example. The assistance device can be driven in a plurality of drive modes having different outputs. Generally, when a drive mode for acquiring a high output is set, an available operation period shortens, and when a drive mode for suppressing the output is set, the available operation period lengthens.

The drive mode selection device according to the present invention estimates the power amount discrepancy on the basis of both the remaining battery charge and the information relating to the predetermined task (the task information) to be executed by the assistance device, and then selects an appropriate mode among the plurality of drive modes.

The predetermined task is a task in which assistance is provided to the user. For example, when the assistance device is mounted on a power-assisted bicycle, the predetermined task consists of "assisting travel from a departure location to a destination".

Further, for example, when the assistance device is a device for assisting the muscle power of a human being, the predetermined task may consist of "assisting 10 package transportation operations".

The task information may include any information relating to the predetermined task. For example, the task information may include information representing tasks to be executed from the start to the end of an operation of the assistance device, and may include information representing (remaining) tasks that have not yet been executed.

According to this configuration, it is possible to provide a favorable assist strength that prevents assistance from becoming impossible partway through the task due to battery run down.

Also, the power estimation unit may estimate a power consumption in a case where the assistance device completes the predetermined task in a predetermined drive mode, and may estimate the power amount discrepancy also on the basis of the estimated power consumption.

The power amount discrepancy is preferably estimated using the estimated power consumption in addition to the task information and the remaining battery charge. According to this configuration, a more appropriate drive mode can be selected.

Also, the predetermined task may be constituted by a plurality of unit tasks, and the power estimation unit may estimate a power consumption required to complete the predetermined task on the basis of an average value of power consumption values of already completed unit tasks and a number of remaining unit tasks.

The unit tasks are a plurality of tasks constituting the predetermined task. For example, when the predetermined task consists of "assisting travel to a destination", each unit task consists of "assisting travel by a predetermined unit distance (10 meters, for example)". Further, when the predetermined task consists of "assisting operations for transporting a plurality of packages", each unit task consists of "assisting an operation for transporting a single package".

By acquiring the average power consumption of the already completed unit tasks in this manner, the power consumption required to complete the entire task can be calculated more accurately.

Also, when the power estimation unit determines that the remaining charge of the battery will run out before the predetermined task is completed in a case where the assistance device is driven in a first drive mode, the mode selection unit may select a second drive mode, which is a drive mode having a smaller power consumption than the first drive mode.

When a deficiency in the remaining battery charge is predicted, assistance can be continued until the predetermined task is completed by modifying the drive mode to a mode having a smaller power consumption.

Also, when the power estimation unit determines that the remaining charge of the battery will not run out before the predetermined task is completed even in a case where the assistance device is driven in a third drive mode, which is a drive mode having a higher output than the first drive mode, the mode selection unit may select the third drive mode.

Conversely, when the remaining battery charge is sufficient to complete the predetermined task, a load on the user can be lightened by switching to a drive mode having a high output.

Also, the mode selection unit may select, as the third drive mode, a drive mode in which the remaining charge of the battery does not run out before the predetermined task is completed and a maximum output is acquired.

According to this configuration, it is possible to provide the maximum assist force that can be provided on the basis of the remaining battery charge, and as a result, an improvement in usability can be achieved.

Also, the mode selection unit may reselect the drive mode periodically while the predetermined task is underway.

When a load exerted on the assistance device is uneven, an error may occur in the estimation result so that the intended assistance cannot be provided. Therefore, processing may be executed periodically to reselect the drive mode. In so doing, an appropriate drive mode can be provide in accordance with a varying load.

Also, the assistance device may be a device for assisting travel by a bicycle using motive power from a motor, and the task information may include information relating to a remaining distance to a destination.

Hence, the drive mode selection device according to the present invention can be implemented favorably as a device for controlling an assistance device mounted on a power-assisted bicycle.

Also, the task information acquisition unit may acquire the information relating to the remaining distance to the destination by communicating with a computer carried by a rider.

Hence, the information relating to the destination may be acquired via a computer (a portable telephone, a smartphone, or the like, for example) carried by the rider. According to this configuration, the device does not have to be provided with a user interface.

Also, the assistance device may be a device for assisting a series of operations performed by a human being using motive power from a motor, and the task information may include information relating to remaining operations among the series of operations.

This type of device is known as a motor function improvement device, a robot suit (registered trademark), a powered exoskeleton (registered trademark), or the like. In this case, a group of a series of operations such as lifting and moving packages may be set as the predetermined task.

Also, the task information acquisition unit may acquire the information relating to the remaining operations by communicating with a computer that manages the assistance device.

According to this configuration, the number of remaining operations among the plurality of assistance target operations can be ascertained accurately.

Note that the present invention may be specified as a drive mode selection device including at least a part of the means described above. The present invention may also be specified as a drive mode selection method executed by the drive mode selection device described above. Moreover, the processing and means described above may be implemented freely in desired combinations as long as no technical contradictions arise as a result.

Advantageous Effects of Invention

According to the present invention, the assist strength of an assistance device that assists a user using electric power can be selected appropriately.

DESCRIPTION OF EMBODIMENTS

The present invention relates to an assistance device that assists a user using driving force acquired from a motor, and more particularly to control for determining an assist strength.

First Embodiment

<Outline of Device>

Figure 1:
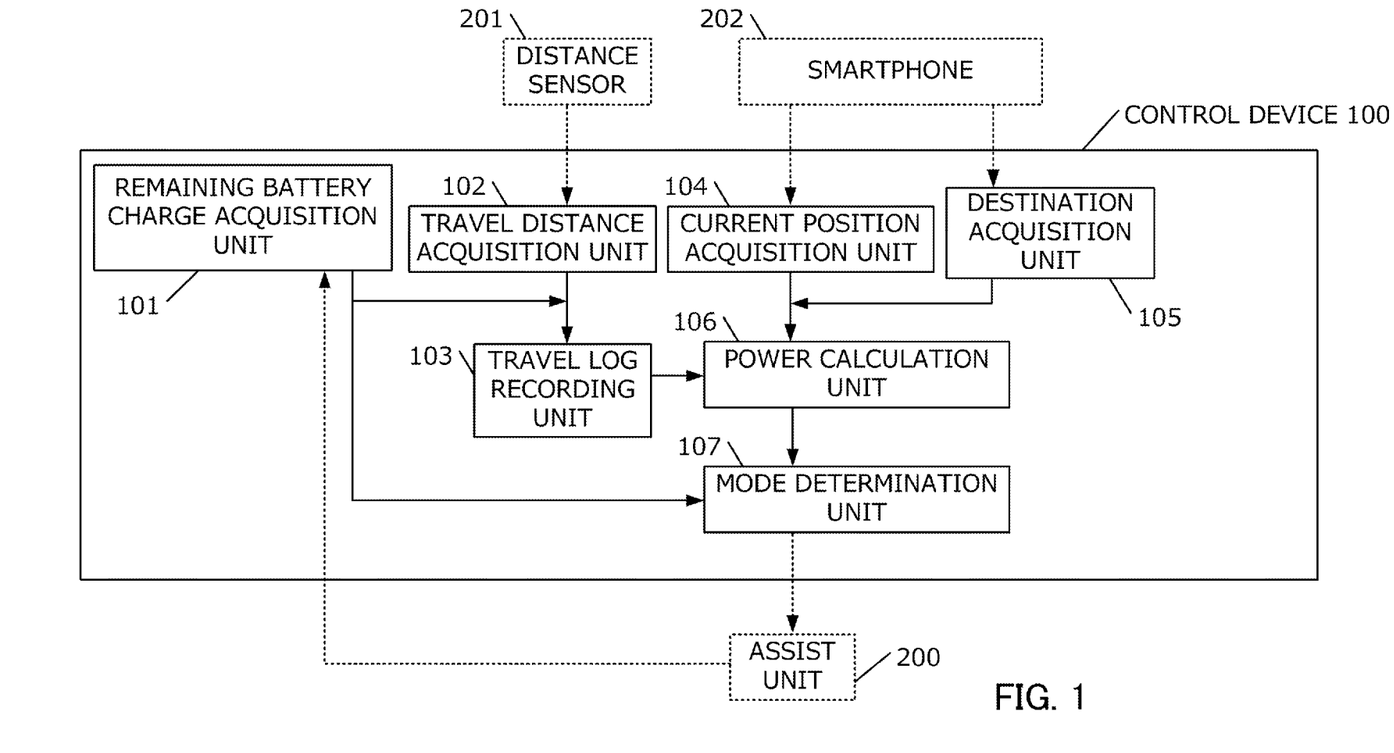
FIG. 1 is a block diagram showing a configuration of a control device 100 according to a first embodiment.

A control device 100 (a drive mode selection device according to the present invention) according to a first embodiment is a device for specifying an assist strength by issuing a control command to an assist unit 200 (the assistance device) provided in a power-assisted bicycle. FIG. 1 is a block diagram showing a functional configuration of the control device 100 according to the first embodiment.

First, the assist unit 200 will be described.

The assist unit 200 is a unit for providing driving force in a power-assisted bicycle, and includes a battery, a motor, a control circuit, a speed sensor, a torque sensor, and so on.

The assist unit 200 determines an output of the motor on the basis of input (a vehicle speed and a torque exerted on the pedals) acquired from the speed sensor and the torque sensor, and assists a rider by driving the motor using electric power acquired from the battery.

Further, the assist unit 200 is configured to be capable of switching between a plurality of assist modes having different assist strengths. In this embodiment, the assist modes are defined in three stages, namely "powerful", "standard", and "eco". When the assist mode is increased in strength, more powerful driving force can be acquired, but an increase in power consumption occurs, leading to a reduced travelable distance. When the assist mode is reduced in strength, on the other hand, the driving force weakens, but the power consumption decreases, leading to an increased travelable distance.

The assist mode can be specified directly by the rider or set "automatically". In this embodiment, when the assist mode is set at "automatic", the control device 100 determines an optimum assist mode in consideration of the remaining battery charge, and instructs the assist unit 200 to switch to the determined assist mode. As a result, an optimum assist force taking into account the remaining battery charge can be acquired.

Next, the configuration of the control device 100 will be described. The control device 100 includes a remaining battery charge acquisition unit 101, a travel distance acquisition unit 102, a travel log recording unit 103, a current position acquisition unit 104, a destination acquisition unit 105, a power calculation unit 106, and a mode determination unit 107.

The control device 100 may be constituted by an information processing device having a CPU, a main storage device, and an auxiliary storage device. The respective means shown in FIG. 1 are caused by function by loading a program stored in the auxiliary storage device to the main storage device, and having the CPU execute the program. Note that all or a part of the illustrated functions may be executed using specially designed circuits.

The remaining battery charge acquisition unit 101 (a remaining charge acquisition unit according to the present invention) serves as means for acquiring data (remaining charge data) indicating the remaining charge of the battery provided in the assist unit 200 from the battery. The remaining charge data may be expressed as an absolute capacity (watt hour, for example) or a relative capacity (a percentage, for example). When the remaining charge data are expressed as a relative capacity, the remaining battery charge acquisition unit 101 preferably holds information relating to a full charge capacity of the battery.

The data acquired by the remaining battery charge acquisition unit 101 are transmitted to the travel log recording unit 103, to be described below.

The travel distance acquisition unit 102 serves as means for acquiring a travel distance of the power-assisted bicycle. The travel distance acquisition unit 102 acquires and outputs the travel distance on the basis of a signal acquired from a distance sensor 201 provided on the bicycle. For example, the distance sensor 201 may acquire a rotation speed of a wheel from a sensor attached to the wheel and calculate the distance using a wheel diameter, or may acquire position information from a GPS receiver and calculate the distance on the basis of position variation.

Travel distance data output by the travel distance acquisition unit 102 may take the form of a relative distance or an absolute distance. For example, the travel distance acquisition unit 102 may be configured to output a signal every time the power-assisted bicycle travels a predetermined unit distance, or to output an integrated distance.

The travel distance data acquired by the travel distance acquisition unit 102 are transmitted to the travel log recording unit 103, to be described below.

Figure 2:
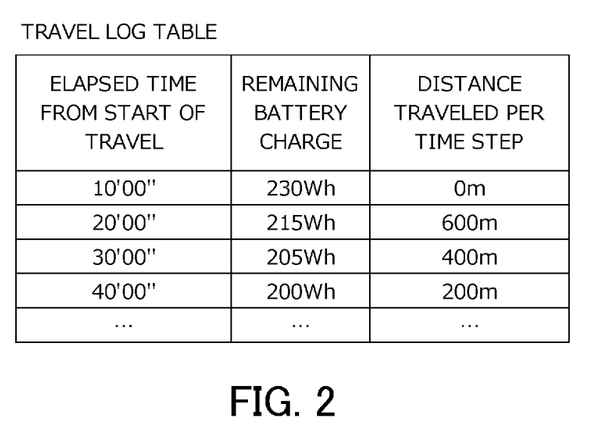
FIG. 2 is an example of a travel log table according to the first embodiment.

The travel log recording unit 103 serves as means for recording the remaining charge data transmitted from the remaining battery charge acquisition unit 101 and the travel distance data transmitted from the travel distance acquisition unit 102 in a table format, for example. FIG. 2 is an example of a table (a travel log table) recorded in the travel log recording unit 103. An elapsed time following the start of travel (a point at which a power supply is switched ON), the remaining battery charge, and a traveled distance per time step are recorded on the travel log table. In this embodiment, one time step is set at 10 minutes. In other words, a new record is added every 10 minutes following the start of travel. Note that the recorded "remaining battery charge" is an absolute capacity, while the "traveled distance" is the distance traveled every 10 minutes.

In this embodiment, the travel log recording unit 103 updates the travel log table over a period extending from the point at which the power supply of the bicycle is switched ON to a point at which the bicycle reaches a destination. Note that in a case where the bicycle stops at a port of call or the like midway through a journey so that the power supply is switched OFF and then switched ON again, the journey may be considered continuous.

When the bicycle reaches the destination, the travel log recording unit 103 may either delete or archive the travel log table. Further, the recorded data may be stored anew in a different area as past data.

The current position acquisition unit 104 serves as means for acquiring information indicating the position of the power-assisted bicycle on which the control device 100 is mounted. Further, the destination acquisition unit 105 serves as means for acquiring a destination specified by the rider. In this embodiment, the current position acquisition unit 104 and the destination acquisition unit 105 acquire the current position and the destination from a portable computer (a smartphone 202, for example) carried by the rider.

Note that the smartphone 202 may acquire the current position using a GPS module or the like, or may receive a specified current position through a user interface. Further, the smartphone 202 may acquire the destination using a route finder application or the like, or may receive a specified destination through the user interface. Alternatively, the destination may be specified automatically on the basis of a movement history of the smartphone 202.

The travel distance acquisition unit 102, the travel log recording unit 103, the current position acquisition unit 104, and the destination acquisition unit 105 together correspond to a task information acquisition unit according to the present invention.

The power calculation unit 106 (a power estimation unit according to the present invention) serves as means for calculating an amount of power (referred to hereafter as a required amount of power) required by the power-assisted bicycle to reach the destination. More specifically, the power calculation unit 106 executes (1) processing for calculating an average power consumption per unit distance on the basis of the travel log table recorded in the travel log recording unit 103, (2) processing for calculating a remaining distance to the destination on the basis of information acquired from the current position acquisition unit 104 and the destination acquisition unit 105, and (3) processing for calculating the required amount of power on the basis of this information. This processing will be described specifically below.

Figure 3:
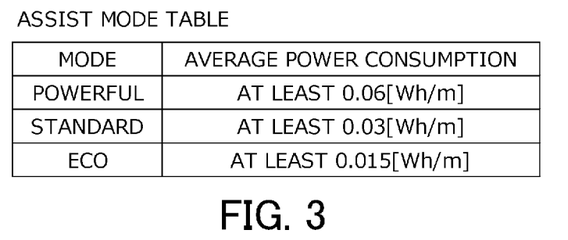
FIG. 3 is an example of an assist mode table according to the first embodiment.

The mode determination unit 107 (a mode selection unit according to the present invention) serves as means for determining the assist mode on the basis of the amount of power calculated by the power calculation unit 106, and the remaining battery charge acquired by the remaining battery charge acquisition unit 101. The mode determination unit 107 holds information relating to the power consumption in each assist mode, and determines the assist mode using this information. FIG. 3 is an example of a table (an assist mode table) showing the power consumption in each assist mode. This table will be described below.

The determined assist mode is transmitted to the assist unit 200, whereupon the mode is modified. A specific determination method will be described below.

<Processing Flowchart>

Figure 4:
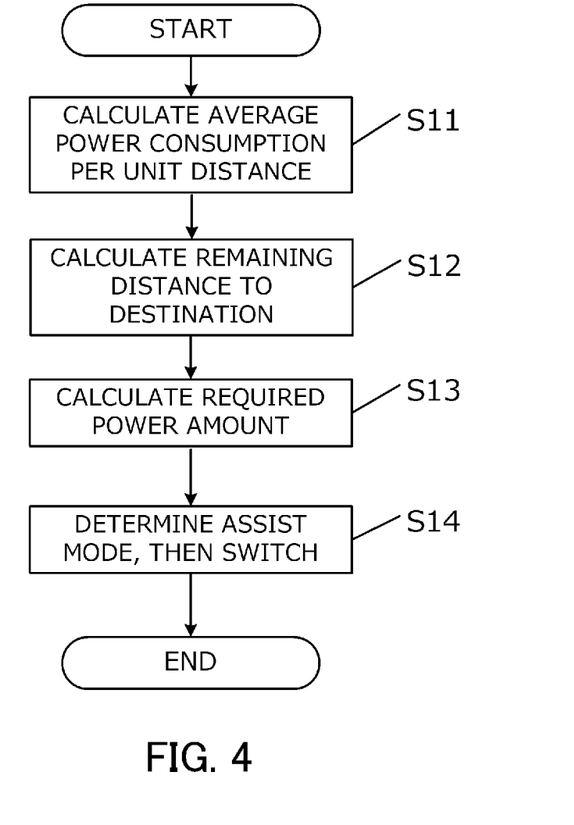
FIG. 4 is a flowchart showing processing according to the first embodiment.

Next, processing executed by the control device 100 will be described with reference to FIG. 4, which shows a processing flowchart. In this embodiment, the processing shown in FIG. 4 is executed at predetermined intervals (every 10 minutes, for example).

Note that the travel log recording unit 103 executes processing for acquiring the remaining battery charge and the travel distance and updating the travel log table during travel, as described above, separately to the processing shown in FIG. 4. It is assumed in the following description that a record has been recorded on the travel log table.

First, in step S11, the power calculation unit 106 calculates the average power consumption per unit distance. In the example shown in FIG. 2, it is assumed that the processing is executed 40 minutes after the start of travel, for example. At this time, the traveled distance from the start of travel is 1200 meters, and the amount of consumed power is 30 Wh. In other words, "0.025 Wh per 1 meter" is calculated as the average power consumption.

Next, in step S12, the power calculation unit 106 calculates the remaining distance to the destination. More specifically, the power calculation unit 106 calculates a distance between two points on the basis of information relating to the current position, acquired by the current position acquisition unit 104, and information relating to the destination, acquired by the destination acquisition unit 105. The distance may be a linear distance or a value acquired by multiplying a coefficient by the linear distance. Further, when map information is included in the device, a path length along a road may be calculated. Alternatively, the distance to the destination may be acquired by communicating with an external computer. For example, distance information may be acquired by transmitting coordinates of the current position and the destination to a server that provides a distance measurement service.

Next, in step S13, the power calculation unit 106 calculates the amount of power required to reach the destination. In this step, the required amount of power is calculated by multiplying the distance acquired in step S12 by the average power consumption per unit distance, calculated in step S11. For example, when the remaining distance to the destination is 10 km and the average power consumption per unit distance (1 m) is 0.025 Wh, the required amount of power is 10000×0.025=250 Wh.

Next, in step S14, the mode determination unit 107 determines the assist mode. In this embodiment, the assist mode is determined according to following rules. Note that in the following formula, r is the remaining battery charge, n is the required amount of power, and C is the full charge capacity of the battery.

(1) When r<n

When the current remaining battery charge is smaller than the amount of power calculated in step S13, a power deficiency is predicted, and therefore the assist mode is modified so as to reduce the power consumption.

(2) When r>n+0.1 C

When the current remaining battery charge is greater than a value acquired by adding a margin (here, 10% of the full charge capacity) to the amount of power calculated in step S13, sufficient power exists, and therefore the assist mode is modified so as to strengthen the assist force. Note that the margin is an example, and other values may be used. For example, a coefficient may be determined by machine learning.

When neither of the above cases apply, the assist mode is not modified.

When the assist mode is modified, a mode in which the maximum assist force is acquired within a range where the remaining battery charge does not run out is selected.

More specifically, a usable average power consumption is acquired by dividing the remaining battery charge by the remaining distance. For example, when the remaining battery charge is 200 Wh and the remaining distance is 10 km, it is evident that 0.02 Wh can be used per 1 m.

Here, referring to the assist mode table shown in FIG. 3, it can be seen that the only mode in which 0.02 Wh can be consumed per 1 m is the "eco" mode. Hence, a command to switch the mode to "eco" is generated and transmitted to the assist unit 200.

In the first embodiment, as described above, the assist mode is modified dynamically on the basis of the remaining battery charge and the remaining distance. As a result, the maximum assist force can be acquired without causing the battery to run down.

Note that in the first embodiment, the current position is acquired via the smartphone 202, but the current position acquisition unit 104 may acquire the current position directly. For example, a GPS module or other position information acquisition means may be mounted on the power-assisted bicycle, and the current position may be acquired from the GPS module or other position information acquisition means.

Further, the destination acquisition unit 105 may acquire the destination directly from the rider. For example, the destination acquisition unit 105 may be provided with an interface (a touch panel display or the like, for example) so as to receive input directly.

Furthermore, in the first embodiment, the travel distance acquisition unit 102 acquires the travel distance using the distance sensor 201, but may calculate the travel distance by acquiring position information from an external computer such as the smartphone 202.

Moreover, in the first embodiment, the processing shown in FIG. 4 is executed every time a predetermined amount of time elapses, but the processing shown in FIG. 4 may be executed at other timings. For example, the processing may be executed every time a predetermined distance is traveled, or may be executed at timings corresponding to the remaining battery charge.

Second Embodiment

In the first embodiment, an assist mode table created on the basis of design values was used. In a second embodiment, on the other hand, the assist mode table is generated dynamically on the basis of actual measurement values. Note that function blocks having identical functions to the first embodiment have been allocated identical reference numerals, and description thereof has been omitted.

In the second embodiment, the power calculation unit 106 transmits the calculated average power consumption to the mode determination unit 107 periodically. The mode determination unit 107 collects the transmitted average power consumption values, and updates the record corresponding to the current assist mode on the assist mode table.

For example, actual measurement values of the average power consumption in the "standard" assist mode are collected, and when the actual measurement value is calculated at 0.035 Wh/m, a value of "at least 0.03", which corresponds to the standard mode, is updated to "at least 0.035". Note that timings at which the average power consumption is collected, a collection period, an aggregation timing, a timing at which the assist mode table is updated, and so on may be designed as required.

According to the second embodiment, the switch destination assist mode can be determined using actual measurement values, and therefore the assist mode can be determined with a higher degree of precision.

Note that when the control device 100 includes means for recognizing the rider, an assist mode table may be generated and updated for each rider. This embodiment is particularly useful in a case where the actual measurement value of the power consumption varies according to the rider.

Third Embodiment

Figure 5:
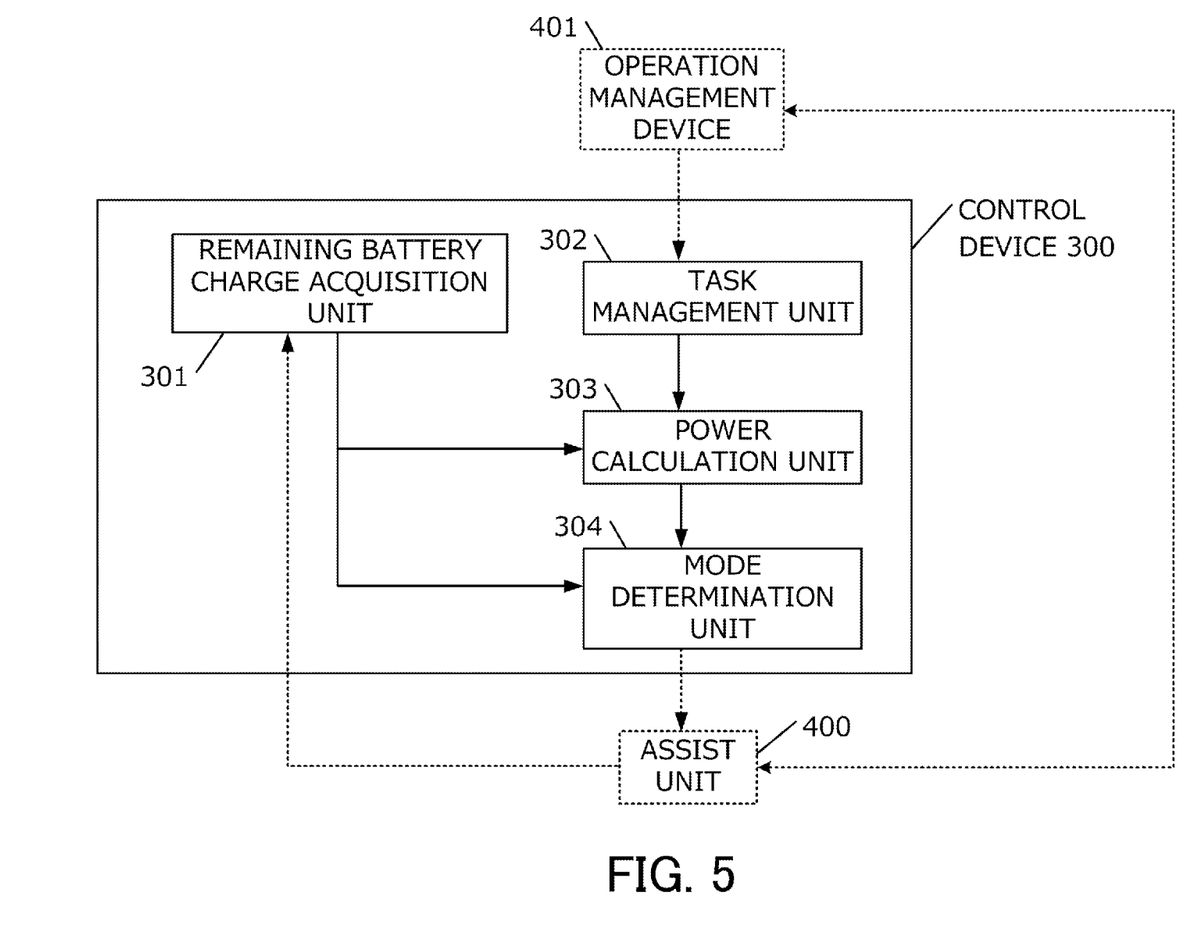
FIG. 5 is a block diagram showing a configuration of a control device 300 according to a third embodiment.

An assistance device according to a third embodiment is a device that is attached to the body in order to assist an operation performed by a person using motive power from a motor. FIG. 5 is a block diagram showing a functional configuration of a control device 300 according to the third embodiment.

An assist unit 400 according to the third embodiment is attached to the body in order to assist muscle power. This type of device is also known as a motor function improvement device or the like. The assist unit 400 includes a battery, a motor, a control circuit, a torque sensor, and so on. The assist unit 400 differs from that of the first embodiment only in the assistance target, and the assist modes and so on are identical.

Further, an operation management device 401 is a computer for managing operations. The operation management device 401 manages the extent to which an assistance target operation remains unfinished by communicating with the assist unit 400. Note that the operation management device 401 may control the assist unit 400 as desired.

Next, the configuration of the control device 300 will be described. The control device 300 includes a remaining battery charge acquisition unit 301, a task management unit 302, a power calculation unit 303, and a mode determination unit 304.

The control device 300, similarly to the control device 100, may be constituted by an information processing device having a CPU, a main storage device and an auxiliary storage device.

The remaining battery charge acquisition unit 301 (the remaining charge acquisition unit according to the present invention) serves as means for acquiring data (remaining charge data) indicating the remaining charge of the battery provided in the assist unit 400 from the battery. The remaining battery charge acquisition unit 301 has identical functions to the remaining battery charge acquisition unit 101.

The task management unit 302 (the task information acquisition unit according to the present invention) serves as means for managing an assistance operation performed by the assist unit 400. Hereafter, the assistance operation performed by the assist unit 400 will be referred to as a task. The task executed by the assist unit 400 is constituted by a plurality of unit tasks. In this embodiment, a case in which a unit task consisting of "assisting an operation to lift and transport a 10 kg package" is executed repeatedly 20 times will be considered as an example.

The task management unit 302 acquires information relating to the task (task information) to be executed from the operation management device 401, ascertains completed tasks on the basis of the task information, and transmits information indicating the entire task and the completed tasks to the power calculation unit 303.

As a result, the power calculation unit 303 can ascertain how many of the 20 unit tasks have been completed.

The power calculation unit 303 (the power estimation unit according to the present invention) serves as means for calculating an amount of power required to complete the entire task. More specifically, the power calculation unit 303 executes (1) processing for calculating an average power consumption per unit task on the basis of the remaining battery charge, acquired by the remaining battery charge acquisition unit 301 and information (information indicating the completed tasks) acquired from the task management unit 302, and (2) processing for calculating the amount of power required to complete the remaining tasks on the basis of information (information indicating the remaining tasks) acquired from the task management unit 302.

Figure 6:
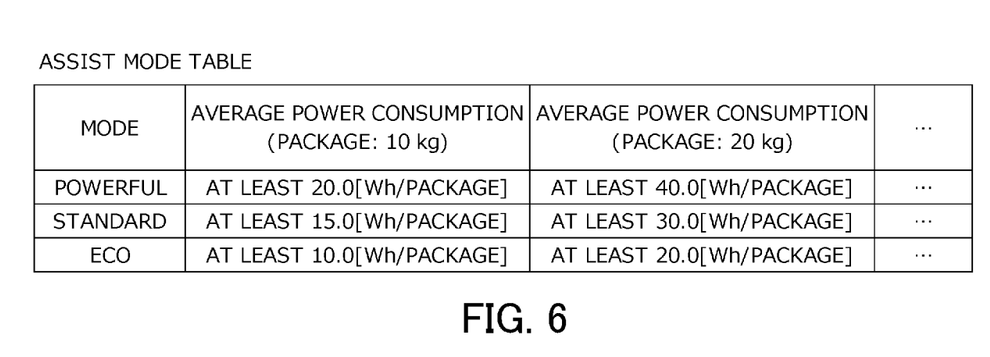
FIG. 6 is an example of an assist mode table according to the third embodiment.

The mode determination unit 304 (the mode selection unit according to the present invention) serves as means for determining the assist mode on the basis of the required amount of power, calculated by the power calculation unit 303, and the remaining battery charge, acquired by the remaining battery charge acquisition unit 101. FIG. 6 is an example of an assist mode table according to the third embodiment. In this embodiment, the average power consumption is defined in accordance with the weight of the handled package.

Figure 7:
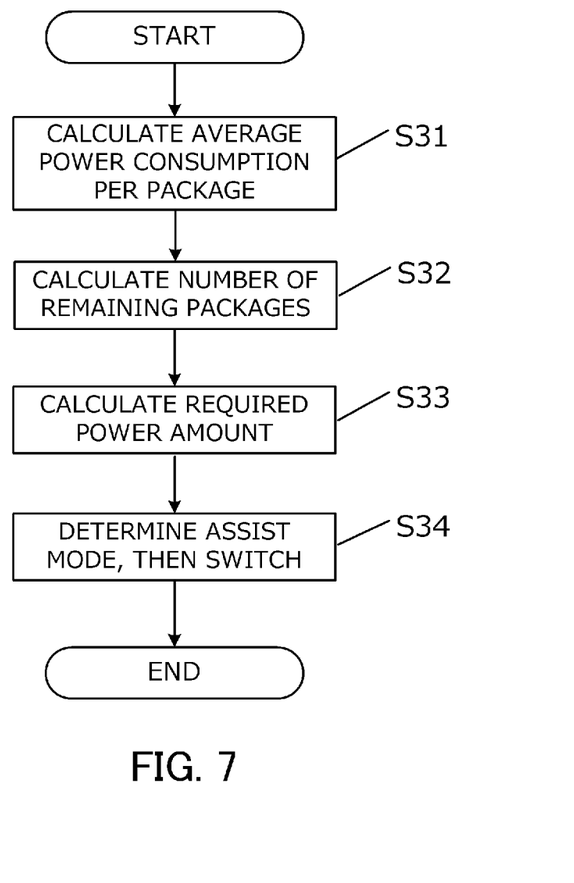
FIG. 7 is a flowchart showing processing according to the third embodiment.

Next, processing executed by the control device 100 will be described with reference to FIG. 7, which shows a processing flowchart. In this embodiment, the processing shown in FIG. 7 is executed every time an operation to transport a package is completed.

First, in step S31, the power calculation unit 303 calculates the average power consumption per package. For example, it is calculated that the amount of power consumed to transport one package weighing 10 kg is 15.0 Wh. Note that the value calculated here may either be a most recent value or an average value acquired after transporting a plurality of packages. It is assumed here that the average power consumption is calculated using cumulative data accumulated from the start of the operation.

Next, in step S32, the power calculation unit 303 calculates the number of remaining packages on the basis of the information acquired from the task management unit 302.

Next, in step S33, the power calculation unit 303 calculates the amount of power required to complete the task. In this step, the required power amount is calculated by multiplying the number acquired in step S32 by the average power consumption per package, calculated in step S31. For example, when the number of remaining packages to be transported is 16 and the average power consumption per package is 15.0 Wh, the required amount of power is 16×15.0=240 Wh.

Next, in step S34, the mode determination unit 304 determines the assist mode. The method of determining the assist mode is similar to that of the first embodiment, but the third embodiment differs from the first embodiment in that the assist mode is determined using the weight of the package. For example, when the package to be transported weighs 10 kg, a column corresponding to a package weighing 10 kg is extracted from the assist mode table shown in FIG. 6 and used.

More specifically, a usable average power consumption is acquired by dividing the remaining battery charge by the remaining number. For example, it can be seen that when the remaining battery charge is 200 Wh and the remaining number is 16, 12.5 Wh can be used per package.

Here, referring to the assist mode table shown in FIG. 6, it can be seen that the only mode in which 12.5 Wh can be consumed per 10 kg package is the "eco" mode. Hence, a command to switch the mode to "eco" is generated and transmitted to the assist unit 400.

Note that in the third embodiment, the packages to be transported are of a single type, but a plurality of types of packages (packages of a plurality of weights) may be combined. Further, tasks other than transporting packages may be combined. In this case, the amount of power should be calculated in accordance with the task.

Furthermore, the number of completed unit tasks may be acquired from a source other than the operation management device. For example, the task management unit 302 may determine that a unit task is complete by detecting arrival at a predetermined location (a package collection location, for example). Arrival at the predetermined location may be determined by short-range wireless communication or the like, for example.

Further, in the third embodiment, the processing shown in FIG. 7 is executed every time an operation to transport a package is completed, but the processing shown in FIG. 7 may be executed at a different timing. For example, the processing may be executed every time a predetermined amount of time elapses, or may be executed at a timing corresponding to the remaining battery charge.

Moreover, in the third embodiment, a task consisting of transporting packages was described as an example, but a task other than transporting packages may be employed. For example, general operations performed during everyday life may be set as tasks. In this case, information relating to attributes and the environment of the user may be input via the smartphone 202 or the like, and task information may be generated on the basis of the input information. Further, the unit tasks may be divided by time rather than by individual operations. For example, "an operation lasting 5 minutes" may be set as the unit task.

Furthermore, likewise in the third embodiment, similarly to the second embodiment, the assist mode table may be generated dynamically on the basis of actual measurement values.

Modified Examples

Note that the embodiments described above are merely examples used to illustrate the present invention, and the present invention may be implemented by modifying or combining the embodiments appropriately within a scope that does not depart from the spirit of the invention.

For example, the control target of the drive mode selection device according to the present invention may be an assistance device of a different type to that described above, as long as the device assists a person using motive power.

Further, in the description of the embodiments, the mode in which the maximum assist force is acquired within a range where the remaining battery charge does not run out is selected, but processing for increasing the assist force does not have to be executed. For example, when it is determined that the task can be completed in the current assist mode, the operation may be continued without modifying the assist mode.

Furthermore, in the description of the embodiments, the assist mode is determined using the assist mode table, but the assist mode may be determined using another method. For example, an assist model obtained by subtracting the output so that the power consumption converges on a desired value may be generated and used.

NOTE

The present invention can be specified as follows.

A drive mode selection device for selecting a drive mode of an assistance device that assists a user by generating motive power using electric power from a battery, and that can be driven in a plurality of drive modes having different outputs, the drive mode selection device comprising a hardware processor and a memory, wherein the memory comprises a power estimation method storage unit that stores an estimation method for estimating a power amount discrepancy on the basis of task information, which is information relating to a predetermined task to be executed by the assistance device, and a remaining charge of the battery; and the hardware processor comprises:

a task information acquisition unit configured to acquire the task information;

a remaining charge acquisition unit configured to acquire the remaining charge of the battery;

a power estimation unit configured to estimate the power amount discrepancy from the task information and the remaining charge of the battery on the basis of the estimation method stored in the power estimation method storage unit; and a mode selection unit configured to select the drive mode on the basis of an estimation result acquired by the power estimation unit.

REFERENCE SIGNS

100 Control device
101 Remaining battery charge acquisition unit
102 Travel distance acquisition unit
103 Travel log recording unit
104 Current position acquisition unit
105 Destination acquisition unit
106 Power calculation unit
107 Mode determination unit
200 Assist unit
201 Distance sensor
202 Smartphone

The invention claimed is:

1. A drive mode selection device for selecting a drive mode of an assistance device that assists a user by generating motive power using electric power from a battery, and that can be driven in a plurality of drive modes having different outputs, the drive mode selection device comprising:

a task information acquisition unit configured to acquire task information, which is information relating to a predetermined task comprising a plurality of unit tasks to be executed by the assistance device;

a remaining charge acquisition unit configured to acquire a remaining charge of the battery;

a power estimation unit configured to estimate a power amount discrepancy on the basis of the task information and the remaining charge of the battery; and a mode selection unit configured to hold information relating to a power consumption in each drive mode and to select the drive mode;

wherein the power estimation unit is configured to:
calculate an average power consumption of a current drive mode on the basis of actual measurement values, and
transmit the average power consumption to the mode selection unit periodically, wherein the mode selection unit is configured to:
update the information relating to the power consumption of the current drive mode using the average power consumption transmitted by the power estimation unit, and
select the drive mode in which the remaining charge of the battery does not run out before the predetermined task is completed, on the basis of an estimation result from the power estimation unit, the updated information relating to the power consumption, a number of remaining unit tasks and the remaining charge of the battery.

2. The drive mode selection device according to claim 1, wherein the power estimation unit estimates a power consumption in a case where the assistance device completes the predetermined task in a predetermined drive mode, and estimates the power amount discrepancy also on the basis of the estimated power consumption.

3. The drive mode selection device according to claim 1, wherein
the power estimation unit estimates a power consumption required to complete the predetermined task on the basis of an average value of power consumption values of already completed unit tasks and a number of remaining unit tasks.

4. The drive mode selection device according to claim 1, wherein, when the power estimation unit determines that the remaining charge of the battery will run out before the predetermined task is completed in a case where the assistance device is driven in a first drive mode, the mode selection unit selects a second drive mode, which is a drive mode having a smaller power consumption than the first drive mode.

5. The drive mode selection device according to claim 4, wherein, when the power estimation unit determines that the remaining charge of the battery will not run out before the predetermined task is completed even in a case where the assistance device is driven in a third drive mode, which is a drive mode having a higher output than the first drive mode, the mode selection unit selects the third drive mode.

6. The drive mode selection device according to claim 5, wherein the mode selection unit selects, as the third drive mode, a drive mode in which the remaining charge of the battery does not run out before the predetermined task is completed and a maximum output is acquired.

7. The drive mode selection device according to claim 1, wherein the mode selection unit reselects the drive mode periodically while the predetermined task is underway.

8. The drive mode selection device according to claim 1, wherein
the assistance device is a device for assisting travel by a bicycle using motive power from a motor, and
the task information includes information relating to a remaining distance to a destination.

9. The drive mode selection device according to claim 8, wherein the task information acquisition unit acquires the information relating to the remaining distance to the destination by communicating with a computer carried by a rider.

10. The drive mode selection device according to claim 1, wherein
the assistance device is a device for assisting a series of operations performed by a human being using motive power from a motor, and
the task information includes information relating to remaining operations among the series of operations.

11. The drive mode selection device according to claim 10, wherein the task information acquisition unit acquires the information relating to the remaining operations by communicating with a computer that manages the assistance device.

12. A drive mode selection method for selecting a drive mode of an assistance device that assists a user by generating motive power using electric power from a battery, and that can be driven in a plurality of drive modes having different outputs, the drive mode selection method comprising:
a task information acquisition step for acquiring task information, which is information relating to a predetermined task comprising a plurality of unit tasks to be executed by the assistance device;
a remaining charge acquisition step for acquiring a remaining charge of the battery;
a power estimation step for estimating a power amount discrepancy on the basis of the task information and the remaining charge of the battery;
a mode selection step for holding information relating to a power consumption in each drive mode and selecting the drive mode;
a calculating step for calculating an average power consumption of a current drive mode on the basis of actual measurement values;
an updating step for updating the information relating to the power consumption of the current drive mode using the average power consumption calculated in the calculating step; and
a selecting step for selecting select the drive mode in which the remaining charge of the battery does not run out before the predetermined task is completed, on the basis of an estimation result from the power estimation step, the updated information relating to the power consumption, a number of remaining unit tasks and the remaining charge of the battery.

13. A drive mode selection device for selecting a drive mode of an assistance device that assists a user by generating motive power using electric power from a battery, and that can be driven in a plurality of drive modes having different outputs, the drive mode selection device comprising a hardware processor and a memory,
wherein the memory comprises a power estimation method storage unit that stores an estimation method for estimating a power amount discrepancy on the basis of task information, which is information relating to a predetermined task comprising a plurality of unit tasks to be executed by the assistance device, and a remaining charge of the battery; and
the hardware processor comprises:
a task information acquisition unit configured to acquire the task information;
a remaining charge acquisition unit configured to acquire the remaining charge of the battery;
a power estimation unit configured to:
estimate the power amount discrepancy from the task information and the remaining charge of the battery on the basis of the estimation method stored in the power estimation method storage unit;

calculate an average power consumption of a current drive mode on the basis of actual measurement values; and transmit the average power consumption to a mode selection unit periodically; and the mode selection unit configured to:

hold information relating to a power consumption in each drive mode and to select the drive mode;

update the information relating to the power consumption of the current drive mode using the average power consumption transmitted by the power estimation unit; and select the drive mode in which the remaining charge of the battery does not run out before the predetermined task is completed, on the basis of an estimation result from the power estimation unit, the updated information relating to the power consumption, a number of remaining unit tasks and the remaining charge of the battery.

* * * * *